Nov. 10, 1931.  C. P. HARRIS  1,831,561
FEEDER FOR COMMINUTED MATERIALS
Filed Sept. 9, 1930
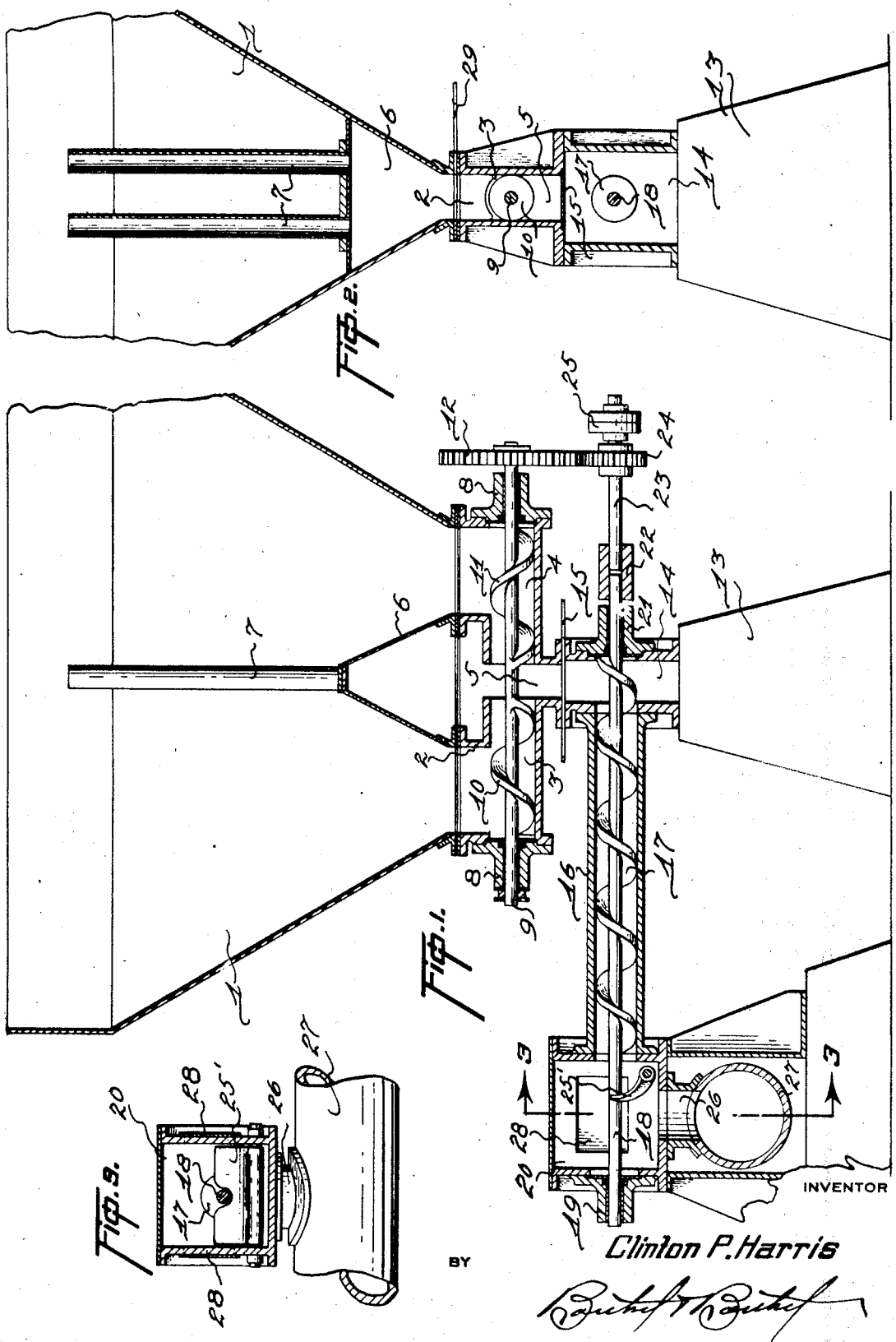
INVENTOR
Clinton P. Harris
ATTORNEYS Patented Nov. 10, 1931

1,831,561

UNITED STATES PATENT OFFICE

CLINTON P. HARRIS, OF ALPENA, MICHIGAN, ASSIGNOR TO HURON INDUSTRIES INC., OF ALPENA, MICHIGAN, A CORPORATION OF MICHIGAN

FEEDER FOR COMMINUTED MATERIALS

Application filed September 9, 1930. Serial No. 480,757.

The present invention pertains to a novel feeding mechanism of a type applicable to kilns, hoppers or practically any type of machine into which comminuted materials are to be fed.

The primary object of the present invention is to devise a feeder having two opposed screws which prevent flushing of comminuted materials from a hopper which is opened directly above a pair of opposed conveyor screws. The comminuted materials are received by the opposed screws as they leave the hopper and carried to a central chamber or feeder box having an overflow compartment and pipe vents to allow for the escape of air. Located in the lower portion of the central chamber is another screw which receives the material and conveys it to a feed pipe which directs the material to a kiln or any machine to which the present feeding mechanism is applied.

With the above and other ends in view the invention consists in the matters hereinafter set forth and more particularly pointed out in the appended claims, reference being had to the accompanying drawings, in which Figure 1 is a longitudinal cross sectional view of the present feeder;

Fig. 2 is a transverse cross sectional view, and

Fig. 3 is a cross sectional view taken substantially on the line 3—3 of Fig. 1.

Like characters of reference are employed throughout to designate the corresponding parts.

The numeral 1 indicates a hopper for receiving various kinds of comminuted materials, the hopper being formed with angular walls converging together towards the lower end. Bolted to the lower end of the hopper is a casing 2 which is formed with a pair of conveyor troughs 3 and 4 and a central opening 5. Above the opening 5 is provided an overflow and ventilating compartment 6 equipped with pipes or tubes 7 which extend upwardly adjacent the top of the hopper.

Bearing members 8 are provided in each end of the casing 3 to support a shaft 9 on which the opposed screws 10 and 11 are formed. One of the outer ends of the shaft 9 is provided with a gear wheel 12 which is driven in a manner presently to be described.

The member 3 is supported upon a suitable base 13 which closes the lower end of the opening 5 to form a feeder box 14, a gate 15 being provided to close or open the opening 5 to regulate the amount of comminuted material passing from the opening 5 to the feeder box 15, a shut-off gate also being provided to entirely prevent the material from passing from the hopper to the feeder box when the device is not in operation. A conveyor tube 16 opens into the side of the feeder box 15 and a screw conveyor 17 is received in this tube, the conveyor being formed with a shaft 18 having one end received in the bearing 19 mounted in the distributor box 20. The opposite end of the shaft 18 is received in a bearing 21 mounted in the side of the feeder box 14. A coupling sleeve 22 couples the shaft 18 to a stub shaft 23 upon which is mounted a gear wheel 24 which meshes with the gear wheel 12, the numeral 25 indicating a clutch member which is connected to any suitable drive.

The feeder box is provided with a baffle 25' which provides resistance to the flow of the comminuted materials through the tube 16, and with an opening in the bottom wall thereof connected by a tube 26 to the pipe 27 which leads the kiln or machine to which the comminuted materials are to be fed.

In operation the clutch member 25 is driven by any suitable power plant and thereby rotates both gears 24 and 12, it being observed that the gear 24 is approximately half the diameter of the gear 12 and therefore the screw 17 rotates approximately at twice the rate of speed as the screws 10 and 11. The screws 10 and 11 when rotated convey the comminuted materials from the hopper 1 into the opening 5 and when the gate 15 is opened the materials fall into the feeder box 14. From the feeder box 14 the screw 17 conveys the materials to the distributing box 20 where the materials pass over the baffle 25 to fall through the tube 26 into the feed pipe 27 which leads to a kiln or furnace. Inspection plates 28 are provided in the sides of the feeder box 20 in order that the flow of material can be observed at intervals to determine as to whether the machine is functioning properly or not.

Although a specific embodiment of the present invention has been illustrated and described it is to be understood that various changes may be made in the details of construction without departing from the spirit of the invention, and such changes are contemplated.

What I claim is:

1. The combination with a hopper for containing comminuted materials and a distributor box into which said materials are to be fed, of a feeder box beneath said hopper, a pair of opposed screw conveyors forcing the materials from said hopper into said feeder box, and a screw conveying said materials from said feeder box into said distributor box.

2. The combination with a hopper for containing comminuted materials, of a feeder box beneath said hopper, opposed screws conveying the material from said hopper into said feeder box, a distributor box, and means for conveying the materials from said feeder box to said distributor box.

3. The combination with a hopper for containing comminuted materials and a distributor box into which said materials are to be fed, of a feeder box beneath said hopper, an overflow compartment equipped with ventilating pipes, a pair of opposed screw conveyors forcing the materials from said hopper into said feeder box, and a screw conveying said materials from said feeder box into said distributor box.

4. The combination with a hopper for containing comminuted materials, of a feeder box beneath said hopper, an overflow compartment connected to said feeder box and equipped with ventilating pipes, opposed screws conveying the material from said hopper into said feeder box, a distributor box, and means for conveying the materials from said feeder box to said distributor box.

5. In combination, a hopper, a feeder box beneath the hopper and having an outlet, an overflow compartment mounted in the feeder box and having a vent opening, and a conveyor arranged below the overflow compartment for discharging material from the hopper through the outlet.

In testimony whereof I affix my signature.

CLINTON P. HARRIS.